3,565,474
EXPOSED-TYPE SUSPENSION SYSTEM
Richard William Stumbo, Jr., Minnneapolis, James Edward Aysta, Stillwater, and William H. P. Tacke, North St. Paul, Minn., assignors to Conwed Corporation, St. Paul, Minn., a corporation of Delaware
Filed Feb. 14, 1969, Ser. No. 799,328
Int. Cl. F16b 7/00
U.S. Cl. 287—189.36                                    21 Claims

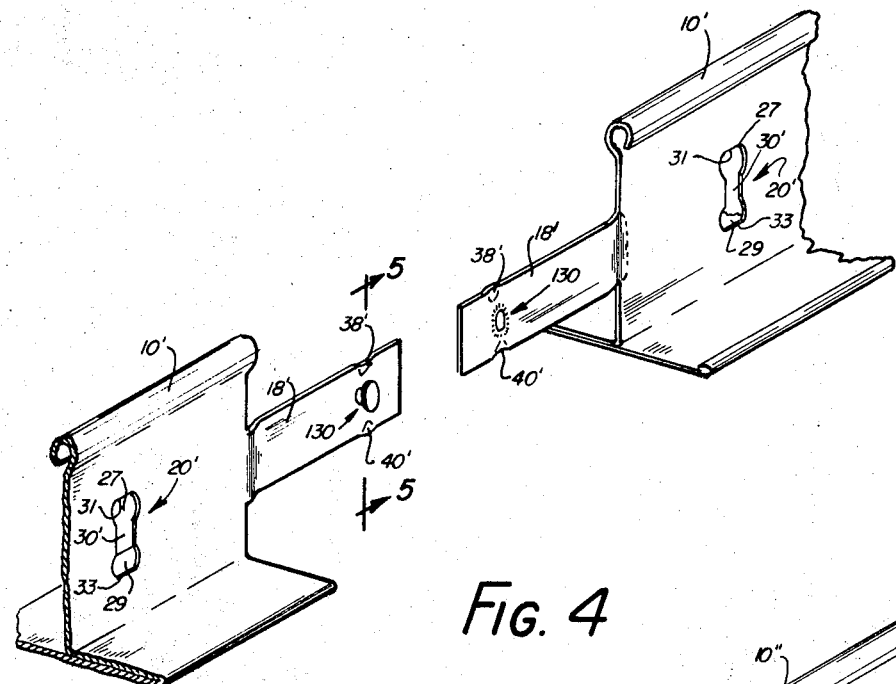
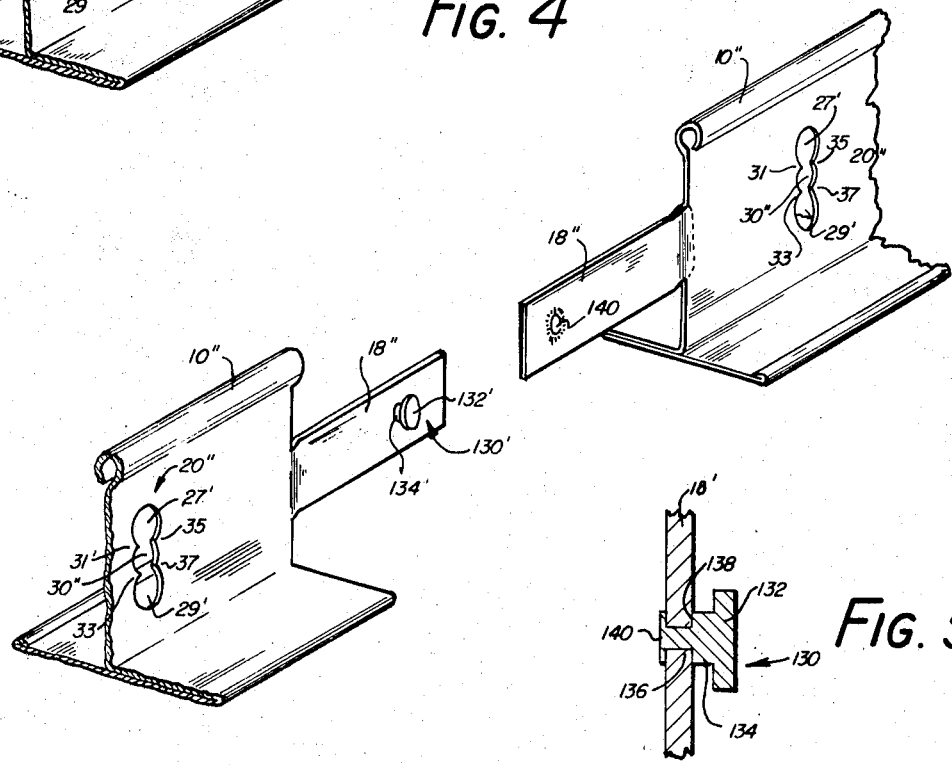
FIG. 4
FIG. 6
FIG. 5
INVENTORS
RICHARD W. STUMBO JR
WILLIAM H. P. TACKE
JAMES E. AYSTA
BY
THEIR ATTORNEY United States Patent Office 3,565,474
Patented Feb. 23, 1971

ABSTRACT OF THE DISCLOSURE

A suspension system of the exposed type has main runners each end of which is identically formed with a vertical slot therein having a centrally located restricted portion and with an extending tongue having extension tabs which will pass through said slot at the larger ends thereof and, upon vertical movement, move into position centrally of said slot where the runners are held in fixed abutting relationship by the connection between the centrally located restricted portion of the slot and the extension tabs.

---

Exposed suspension systems of the type utilizing longitudinally extending main runners of generally inverted T-shape and transversely extending cross-runners of similar cross shape are well known. One of the problems of such systems is the manner in which links of longitudinal main runners are attached to one another in abutting fashion.

Another of the problems is the manner in which the cross-runners attach to the main runners at right angles thereto.

Various end structures have been proposed for providing attachments between abutting main runners and between main runners and cross-runners; however many of these proposed systems have required either (1) expensive additional clips or joint attaching mechanisms or (2) expensive attachments secured to the ends of the main runners and the cross-runners.

One object of the invention is to provide such an inverted T suspension system in which the attachment mechanism for the main runners and for the cross-runners are formed integrally with the ends thereof.

Another object of the invention is to provide such a suspension system in which longitudinal movement of the runners at the joints where they are interconnected is limited or eliminated.

Still another object of the invention is to provide such a suspension system which may be readily assembled and disassmbled without the use of tools.

Figures 1, 1A, 2:
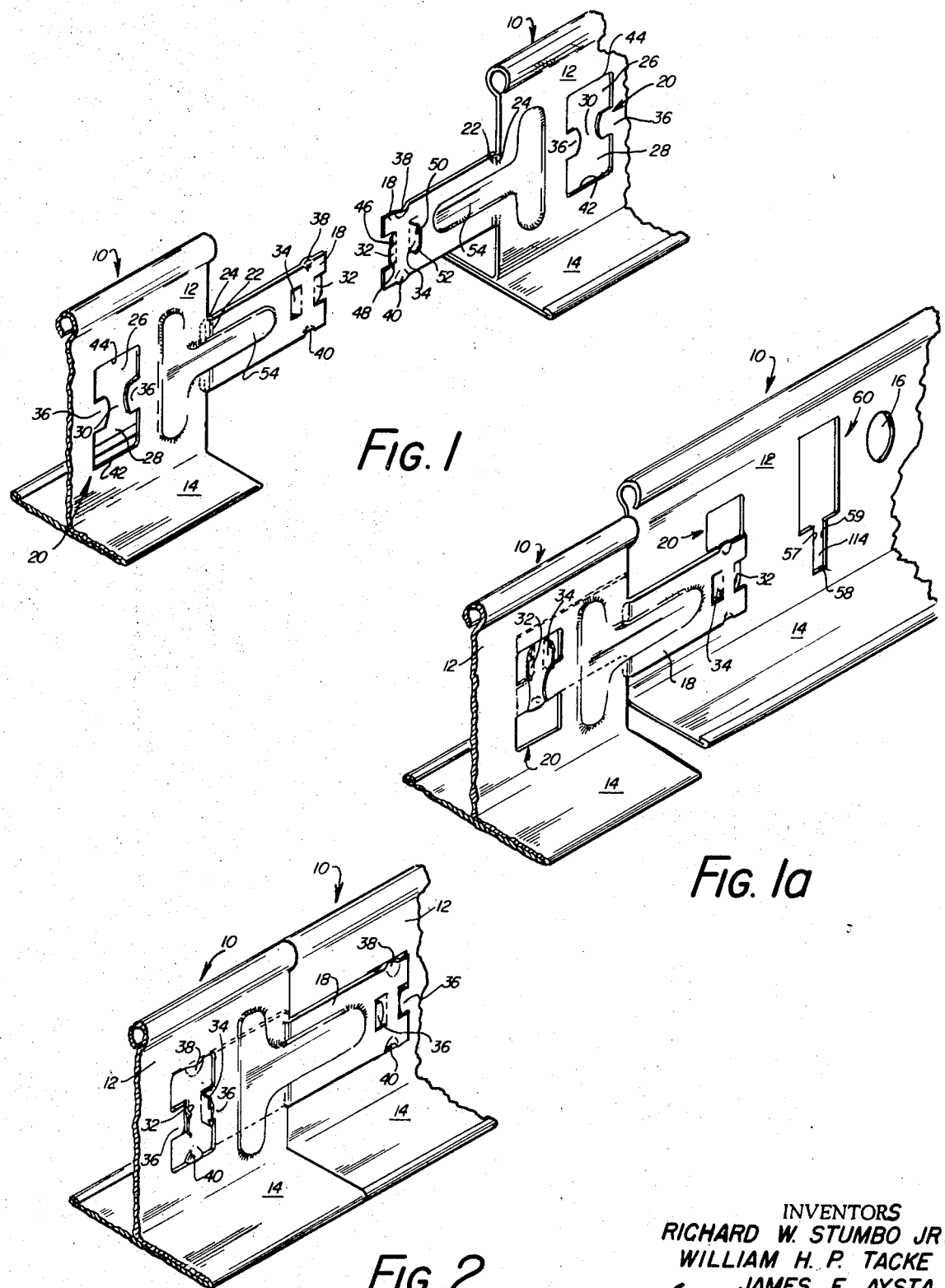
Figure 3:
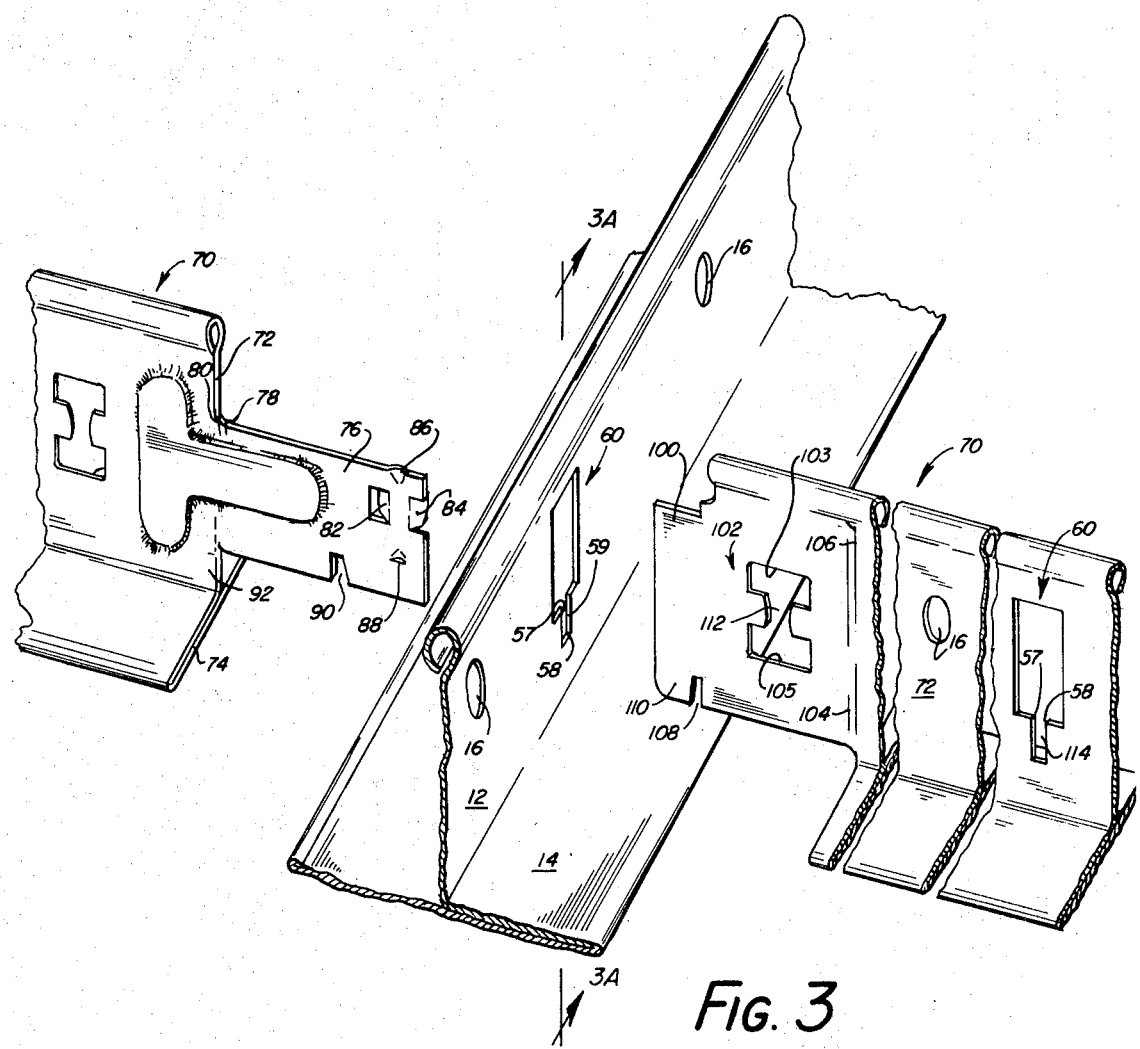
Figure 3A:
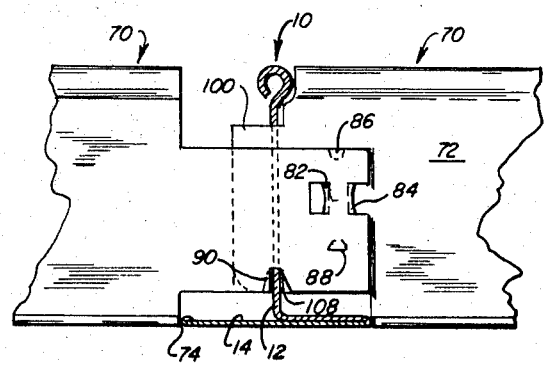
Figure 7:
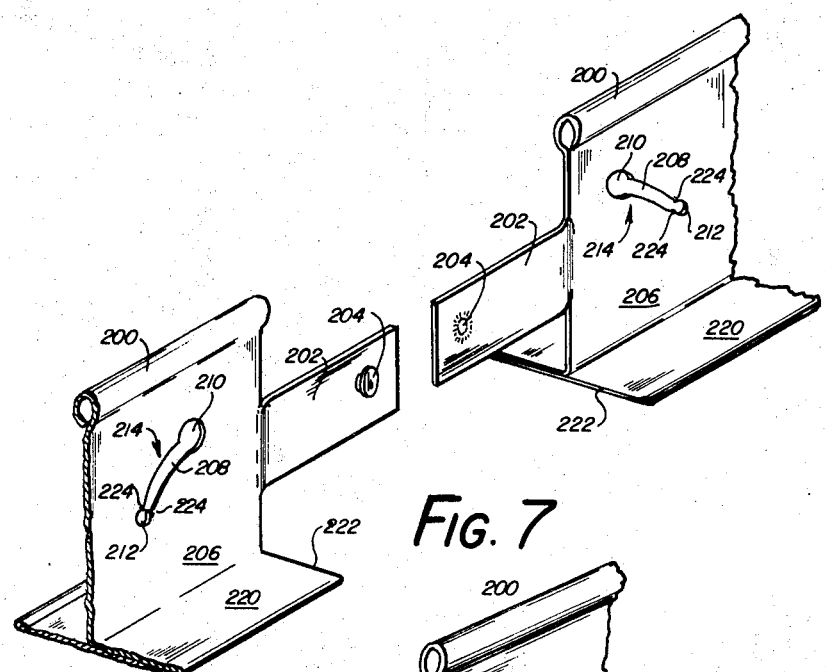
Figure 7A:
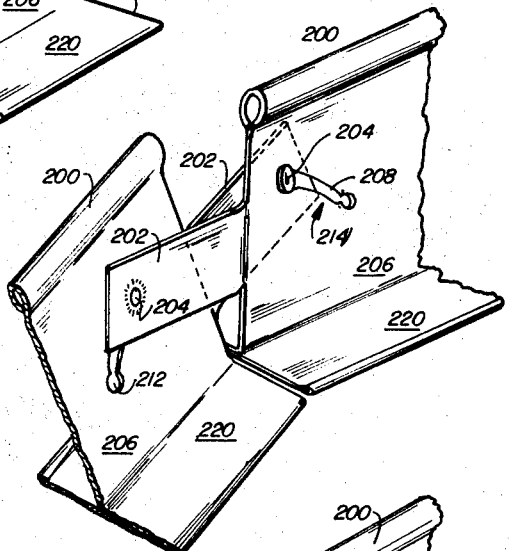
Figure 8:
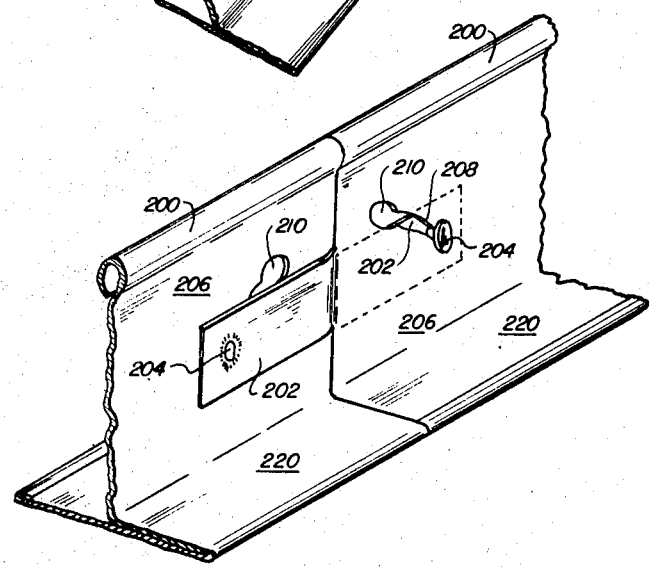
Figure 9:
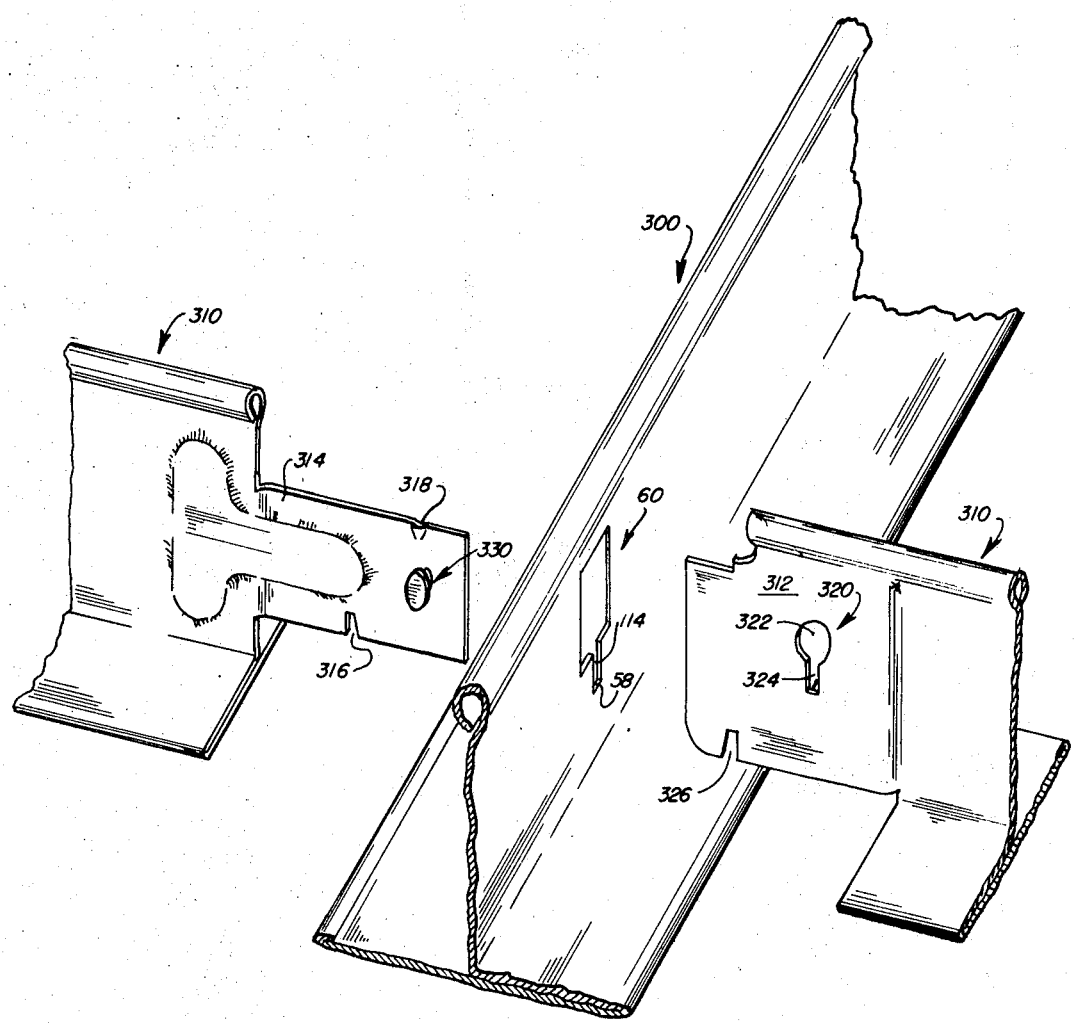

These and other objects of the invention will be apparent to those skilled in the art from the following specification and drawings in which:

FIG. 1 shows two main runners with their ends in juxtaposition before being connected together, FIG. 1A shows the runners of FIG. 1 during assembly or disassembly, FIG. 2 shows the runners of FIG. 1 after being connected in abutting relationship, FIG. 3 shows two cross-runners before being connected together through a main runner, FIG. 3A shows the cross-runners of FIG. 3 in assembled relationship to a main runner taken along line 3A—3A of FIG. 3, FIG. 4 is a modification of the invention, FIG. 5 is a cross section along line 5—5 of FIG. 4, FIG. 6 shows a second modification of the invention, FIG. 7 shows still a third modification of the invention, FIG. 7A shows the runners of FIG. 7, during assembly or disassembly, FIG. 8 shows the runners of FIG. 7 in assembled position, and FIG. 9 shows a modification for use on the cross-runners.

While variation may exist as to the particular plan or layout of suspension systems of the exposed type (utilizing suspension members of generally inverted T cross section) the common layout provides for longitudinal runners extending the length of the room at ceiling height with the runners spaced on, for example, four foot centers. Extending between adjacent main runners, cross-runners are provided which attach to the adjacent longitudinal runners. Commonly such cross-runners are placed on two foot centers although other dimensions, as indicated above, are known such as three foot centers, and five foot centers.

Such an arrangement necessitates that the main runners, commonly made up from twelve foot lengths, be made up by attaching the main runners in longitudinal abutting relationship. Provision must also be made for attaching the ends of the cross-runners to the main runners.

As shown in FIG. 1 the main runners 10 comprise a vertical web portion 12 and laterally extending horizontal flanges 14. It will be seen that the horizontally extending flanges 14 extend both directions laterally from the web portion 12 at generally a right angle thereto. The main runners 10 are supported from the fixed ceiling thereabove by means of wires passed through the opening 16 (see FIG. 1A) in known manner.

The interlocking mechanism at the ends of the runners 10 for locking the same in abutting relationship includes a tongue 18 extending from the web 12 and integral therewith. It will be seen that the tongue 18 is in a plane parallel to, but offset from, the web 12 by virtue of the double bends 22 and 24.

The interlock mechanism also includes a slot 20 extending generally vertically of and entirely through the web 12. The slot 20 has enlarged end portions 26 and 28 and a central restricted portion 30.

The tongue 18 has two tabs 32 and 34 struck from the material of the tongue 18 with both tabs 32 and 34 being struck in the same direction from the tongue 18.

The tabs 32 and 34 constitute means projecting laterally from the tongue 18 and, considered together, are so dimensioned that they both pass readily through either of the enlargements 26 or 28 of the slot 20 when the tongue 18 of one runner 10 is placed in face-to-face relationship on one side of the web 12 of a longitudinally adjacent and abutting runner 10.

As best shown in FIG. 1A, when the two main runners 10 are being assembled, the tabs 32, 34 of one runner 10 will be passed through the enlargement 26 of the slot 20 of the other runner 10. Simultaneously, the tabs 32 and 34 of the other runner 10 will be passed through the lower enlargement 28 of the slot 20 of the first runner 10. Accordingly, FIG. 1A shows two main runners 10 during assmbly but prior to completion of such assembly.

After the two runners 10 have been placed generally in the position of the parts as shown in FIG. 1A, they are moved vertically with respect to each other to bring the inner narrower portion of the tabs 32, 34 of each of the runners 10 into the restricted portion 30 of each of the slots 20 as shown in FIG. 2. In the positions of the parts as shown in FIG. 2 the walls 36 of the restricted portion 30 of the slot 20 fit tightly to the inner portion of the tabs 32, 34 and within the angle formed between the tongue 18 and the tabs 32, 34 of the adjacent, abutting, and now attached main runner 10. Accordingly, the tabs 32, 34 as well as the tongue 18 and the entire runner 10 are held in fixed relation to the adjacent runner 10.

It will be seen that by this arrangement, whereby the runners are attached by a substantially vertical movement between adjacent runners, the runners are held with little or no "play" longitudinally of the runners. This provides for a very tight abutment between the ends of adjacent flanges 14 thus preventing unsightly gaps which would be visible from the room beneath the ceiling.

In order to retain the vertical alignment of the runners 10, after they have been assembled into the position shown in FIG. 2, each of the tongues 18 is provided with upper and lower stops 38 and 40 respectively. These stops 38 and 40 are dimensioned to fit readily within either the enlarged portion 26 or the enlarged portion 28 of a slot 20 in an adjacent runner 10. It will be seen from FIG. 1A that when the tabs 32 and 34 on a tongue 18 are entered through an upper enlargement 26 the associated stop 40 passes through the upper portion of the lower enlargement 28 of the same slot. Similarly, when the tabs 32 and 34 are passed through the lower enlargement 28 of a slot 20 of an adjacent main runner 10 the stop 38 will pass through the lower portion of the enlargement 26 at the top of a slot 20 of an adjacent main runner 10.

After substantially vertical movement of two adjacent runners 10 with respect to each other to bring the parts into the position shown in FIG. 2 it will be seen that the stop 40 passes through the lower enlargement 28 and there rests upon the lower wall 42 thereof while the upper stop 38 passes through the enlargement 26 and bears against the upper wall 44 thereof. In this way the main runners 10 are prevented, in their assembled position as shown in FIG. 2, from moving vertically with respect to each other thus maintaining the tabs 32, 34 within the restricted portion 30 of its cooperating slot 20 of the adjacent runner 10. Accordingly, the assembly is held against accidental displacement of the tabs 32 and 34 from the restricted portion 30 of the slot 20 and the runners 10 are thus held in fixed relationship to each other.

While reference has been made herein to movement of the runners 10 vertically with respect to each other during assembly it will be appreciated that initially they must be moved substantially horizontally with respect to each other to pass the tabs 32, 34 of one tongue 18 through either the enlargement 26 or the enlargement 28 of a slot 20 of an adjacent runner 10.

While the stops 38 and 40 will prevent accidental vertical movement of the main runners 10 with respect to each other after assembly into the position shown in FIG. 2, a slight twisting action combined with vertical movement can be applied to disassemble the runners 10, if desired.

It will be seen that, in order to facilitate assembly, the upper and lower corners of the walls 36 that partially define the space 30 are curved as shown in the figures. For a similar reason the upper and lower corners 46 and 48 of the tab 32 and the upper and lower corners 50 and 52 of the tab 40 are bent back further than the associated tab in order to assist in camming the inner portions of the tabs 32, 34 into place within the restricted space 30.

The embossed portion 54 is formed in the end of the web 12 and extends into the tongue 18 across the bends 22 and 24 in order to provide additional strengthening at this point.

Arranged at spaced intervals along the main runner 10 are a plurality of vertical slots 60 of a configuration different from that of the vertical slots 20. These slots 60 are arranged (for example, every six inches) for the reception of suitable cross-runners 70. As shown in FIGS. 3 and 3A the cross-runners 70, unlike the main runners 10, are not formed identically on each end. The cross-runners 70 comprise a vertical web portion 72 and horizontally extending flanges 74 similar, and essentially identical, in construction to the corresponding web 12 and flanges 14 of the main runners 10.

Extending from the web 72 of each of the cross-runners 70 is a tongue 76 integral with the web 72 and positioned in a plane parallel to but offset from the plane of the web 72 by virtue of the bends 78 and 80 corresponding generally to the bends 22 and 24 of the main runners 10. The tongue 76 also has tabs 82 and 84 identical to the tabs 32 and 34 of the tongue 18. The tongue 76 has a vertical stop 86 identical to the vertical stop 38 of the tongue 18. The tongue 76 has a greater vertical dimension than the tongue 18 and as such the lower stop 88, while substantially identical to the stop 40 in the tongue 18, is not positioned at the lower edge 92 of the tongue 76 but is positioned wholly within the tongue 76.

As indicated, the cross-runners 70 each have a slot 20 identical in all respects to the slot 20 in the main runners 10. In this way the cross-runners 70, which are generally provided in shorter lengths, may be attached to the main runner 10 in those instances where cutting of a main runner 10 to a shorter length than usually provided (commonly twelve feet) would result in waste of material. In such circumstance, the end of the cross-runner 70 having the tongue 76 is attached to either end of a main runner 10 having a tongue 18 in the same way as two main runners are connected as shown in FIG. 2. Since main runners, as indicated, are commonly provided in twelve foot lengths, it frequently arises that the room to which the ceiling is to be applied is not an even multiple of twelve feet. In such circumstance it is common to cut a main runner 10 to an appropriate length to make up the difference. If such difference happens to be exactly six feet it is possible to cut a main runner 10 into two parts of equal length using one six foot length for the end of one row of main runners and the other six foot length for an adjacent or other row of main runners 10. However, when the room length requires an end piece of less than six feet a shorter cross-runner 70 may be utilized since these are commonly provided in lengths of from one foot to five feet in length in one foot increments. Considerable savings of material are thus accomplished. Of course, when a cross-runner is so used, the end of the runner 70 opposite to that carrying the tongue 76 must be cut off and removed since it is not needed and abuts a wall moulding piece.

It will be appreciated that the hanger wire opening 16 and the slot 60 for reception of cross-runners are provided in the cross-runners 70, as shown in FIG. 3, for use only when such cross-runners 70 are used as extensions of main runners in those instances in which cutting of a main runner would result in excessive waste of material. When the runner 70 is used as a cross runner the hanger wire openings 16 and the cross-runner slots 60 are not utilized.

When used in its cross-runner position the entire runner 70 as shown in FIG. 3 is used. At the opposite end of the cross-runner 70 from the end carrying the tongue 76 is a tongue 100 having therein a slot 102 in all respects identical to the slot 20. The tongue 100 is offset in a plane parallel to the plane of the web 72 but spaced therefrom by virtue of the bends 104 and 106 in a similar manner to the offset bends 22, 24 in the main runners 10 and offsets 78, 80 for the tongue 76 in the cross-runners 70. The tongue 100 also has a notch 108 in the lower edge 110 thereof. The notch 108 embraces the web 12 of a main runner 10 at the lower wall 58 of a slot 60 in a main runner 10 when the cross-runners 70 are applied to such a main runner 10. The tongue 76 has a similar notch 90 along its lower edge 92 to similarly embrace the web 12 at the bottom wall 58 of a slot 60 in a main runner 10. As shown in FIG. 3A the tongues 76 and 100 cooperate to lock two adjacent cross-runners 70 to a main runner 10 by passing the tongue 76 of one cross-runner 70 and the tongue 100 of an adjacent cross-runner 70 each through the same slot 60 in a main runner 10. In this position they are locked with the tabs 82 and 84 in the restricted portion 112 of the slot 102 in the same fashion as the main runners 10 are locked together. The stops 86, 88 engage upper and lower walls 103, 105 respectively of the slot 102 to prevent accidental vertical movement of the runners 70 and thus hold the parts in locked relationship. It will be seen that the width of the slot 60 is sufficient to pass the tongues 76 and 100 and the laterally extending tabs 82, 84 before the tongues are interlocked whereas after the same have been interlocked they can rest in the narrower portion 114 of the slot 60 with the walls 57 and 59 embracing the two tongues 76, 100 therebetween in locked, face-to-face relationship.

It will be appreciated that the main runners 10 are identical on each of their ends and as such are reversible end to end; however, if non-reversibility is not necessary only one end of a runner 10 need have the tongue 18 with the tabs 32 and 34. In such an arrangement, the other end of the web 12 will thus be provided with the slot 20. Of course, the reverse arrangement wherein the tongue 18 is provided with the slot and the other end of the web 12 has the tabs 32, 34 could also be utilized, but the former arrangement is preferred. However, with both ends identical as shown, for example, in FIG. 1 there are two interlocks at each joint between two sets of tabs 32, 34 and two slots 20 and such arrangement is preferred.

Additionally, it will be understood that the slot 20 need have only one enlargement 26 or 28 with the slot 20 at the opposite end having the other of the enlargements 26 or 28; however, again, this prevents reversibility of the runners 10. In the cross-runners 72, which are not reversible, the slots 102 need be provided with only one of the enlargements at one end rather than enlargements at both ends.

FIG. 4 shows a modification of two main runners 10' similar to the runners 10 having tongues 18' and slots 20'. The tongues 18' have upper and lower stops 38' and 40' in all respects identical to stops 38 and 40 shown in FIG. 1. The slot 20' has a restricted portion 30' and enlarged end portions 27 and 29. As shown, enlarged portions 27 and 29 are substantially circular to receive the head 132 of a rivet 130 which is riveted in place on each of the tongues 18'. However, the outer portions of enlargements 27 and 29 have short flat portions 31 and 33 respectively to cooperate with stops 38' and 40' respectively. As best shown in FIG. 5, the rivet 130 comprises a head 132, reduced shank portion 134, and a further reduced stem portion 136. The rivet 130 is held in place in the tongue 18' by passing the stem 136 through a suitable opening through the tongue 18' and crimping the end of the stem 136 as indicated at 140. Thus the rivet 130 is held in place by embracing the outer surfaces of the tongue 18' between the crimped portion 140 of the rivet and the shoulder 138. The head 132 of the rivet 130 will readily pass through either the enlargement 27 or the enlargement 29 of the slot 20' and upon substantially vertical movement between the two runners 10' the shank 134 will be brought into alignment within the restricted portion 30' of the slot 20'. The restricted portion 30' tightly embraces the outer surface of the shank 134 in the same manner as the restricted portion 30 (FIG. 1) of slot 20 embraces the inner portions of the tabs 32, 34 adjacent the facing surface of the tongue 18.

FIG. 6 shows a modification of FIG. 4 primarily with respect to the rivet receiving slot. The main runners 10" are identical on each of their ends and have tongues 18" extending therefrom having a rivet 130' therethrough in the same fashion as the rivet 130 is placed in the tongue 18' (FIG. 5). The tongues 18", however, do not have vertical stops comparable to the vertical stops 38', 40' shown in FIG. 5 for reasons that will presently appear. The rivet receiving slot 20" has enlarged end portions 27', 29' similar to enlarged portions 27, 29 of the slot 20' shown in FIG. 4. The enlarged portions 27', 29', however, do not have a flat surface comparable to surfaces 31, 33 of the enlargements 27, 29 for reasons described below. The restricted portion 30" of the slot 20" is circular, i.e. its walls are curved to tightly embrace the outer surface of the cylindrical shank 134' of the rivet 130'. Between the enlarged portion 27' and the restricted portion 30" are two ears 31, 35 projecting inwardly. Between the restricted portion 30" and the enlarged portion 29' are two additional ears 33, 37 which project inwardly. The ears 31, 33, 35, and 37 serve to give a definitive "snap" when the shank 134' is moved into its proper assembled position within the restricted portion 30". Additionally, the vertical stops 31, 33, 35, and 37 serve to retain the rivet 130' against accidental vertical displacement thus eliminating the need for the vertical stops such as 38', 40', or for the cooperating flat surfaces 31, 33 as shown in FIG. 4.

As indicated above with respect to the various modifications shown in FIGS. 1, 4, and 6, in order to make the main runners reversible it is necessary that the slots 20, 20', and 20" have enlarged portions at both ends when it is desired to have a double locking arrangement. This is due to the fact that during assembly when the two main runners are vertically displaced, the laterally extending locking projections of one tongue 18, 18', and 18" will be above and the other below the center of the cooperating slot 20, 20', and 20". FIGS. 7, 7A, and 8, however, show a double locking, reversible main runner connection in which only one enlargement is necessary for the slot. In the modification of FIGS 7, 7A, and 8, the two main runners are not moved vertically with respect to each other while the longitudinal axes of the runners remain substantially parallel as in FIGS. 1–6, but rather the runners move in an arc about a point during assembly and disassembly.

As shown in FIG. 7 the main runners 200 are identical on each of their ends and include outwardly projecting tongues 202 having rivets 204 therein which are identical to the rivets 130 shown in FIG. 5. The vertical web 206 has a curved rivet receiving slot 214 therethrough. At one end the slot 214 has an enlarged portion 210 for reception of the head of the rivet 204. Curving downwardly from the enlarged portion 210 is a more restricted portion 208 which may be of the same width throughout but is preferably slightly tapered as shown.

As shown in FIG. 7A, when two runners 200 are to be connected they are angularly disposed downwardly from the joint and the head of the rivet 204 in each of the tongues 202 is passed through the cooperating enlargement 210 of the cooperating slot 214. The runner 200 is then moved upwardly in an arc about a point at or adjacent to the outer lower corner 222 of the horizontal flanges 220. This movement will cause the shanks of the rivets 204 to move downwardly into the portions 208 of the slots 214 and finally come to rest at the bottom 212 of the slot 214. Desirably, the slots 214 are provided with inwardly projecting stop members 224 to prevent unintentional dislodgement of the shank of the rivet 204 from its position at the bottom 212 of the slot 214. As shown in FIG. 8, when the shanks of the rivets 204 are in position at the bottom 212 of the slots 214 the main runners 200 are in alignment and locked together. The stops 224 are preferably bent slightly laterally of the web 206 as shown to aid in passing the shank of rivet into the bottom 212 of the slot 214 and thus providing some "spring" action to the stops 224, which will, nevertheless, firmly hold the shank of rivet 204 in place but permit removal by applying manual pressure to the runners 200.

The particular point about which the runners 200 must swing to interlock may be the front lower corner 222 of the flanges 220 or some other point determined by the curvature of the length of the slot 214 and the other dimensions of the ends of the runners 200. The particular point about which the runners 200 swing to interlock and the particular curvature of the length of the slot 214 are chosen to result in a tight and smooth flush fit between the ends of the exposed flanges 220 as shown in FIG. 8.

FIG. 9 shows the construction of suitable cross-runners for use particularly with the main runners of the modifications of FIGS. 4-8, but also useable with the main runners of FIGS. 1-3. As shown in FIG. 9, a main runner 300 having a slot 60 therein is disposed to receive two cross-runners 310. Each of the cross-runners 310 has a tongue 312 at one end thereof and a tongue 314 at the other end thereof. The tongue 314 has a rivet 330 therein comparable in all respects to the rivet 130 shown in FIGS. 4-8. The lower edge of the tongue 314 has a notch 316 therein in all respects identical to the notch 90 shown in FIG. 3. At its top edge the tongue 314 has a vertical stop 318 in all respects identical to the stop 86 in the tongue 76 shown in FIG. 3.

The tongue 312 has a keyhole shaped slot 320 therein having an enlarged upper portion 322 and a restricted portion 324. At its lower edge the tongue 312 has a notch 326 in all respects identical to the notch 108 in the tongue 100 shown in FIG. 3.

During assembly the tongues 312 and 314 are passed through the slot 60 and the rivet 330 is engaged first in the enlarged portion 322 of the slot 320 and then moved vertically downwardly into the restricted portion 324 of the slot 320. When assembled the adjacent runners 310 will have the notches 316 and 326 of the runners 314 and 312 respectively embracing the lower wall 58 of the slot 60 and the tongues 312 and 314 will be embraced within the space 114 of the slot 60 in substantially the identical fashion as illustrated in FIG. 3A for the cross-runners 70.

It will be noted that since the runner 310 is not reversible there is no need for two enlargements in the slot 320. The enlargement 322 could be at the top or the bottom with respect to the restricted portion 324, it being only necessary that the restricted portion 324 and the rivet 330 be in alignment when the tongues 312 and 314 are in position in the slot 60 with their notches 316 and 326 within the space 114 and embracing the lower wall 58 of the slot 60. Positioning of the enlargement 322 at the top of the restricted portion 324 is, however, preferred.

We claim:

1. A ceiling suspension system comprising at least two elongated runners interconnected with their longitudinal axes substantially in alignment; each of said runners having a portion thereof in overlapping relationship to a portion of the other of said runners; a slot through an overlapping portion of one of said runners; the length of said slot being at an angle to the longitudinal axes of said runners, said slot having a restricted portion, said slot having an enlarged portion communicating with said restricted portion and of greater area than said restricted portion; means for engagement in said slot; said slot engaging means projecting laterally from an overlapping portion of the other of said runners and through said restricted portion of said slot; said slot engaging means having a portion of fixed cross-sectional area and a portion of an area larger than said fixed area portion; said restricted portion of said slot being of such a size as to prevent removal of said larger area portion of said laterally projecting means from engagement therewith by movement laterally of the longitudinal axes of said runners; said enlarged portion of said slot being of a size to pass said larger area portion of said laterally projecting means during assembly and disassembly of said runners; and said restricted portion of said slot, in assembled position of the runners, being so positioned with respect to said enlarged portion of said slot as to prevent movement of said runners longitudinally with respect to each other.

2. The suspension system of claim 1 including a third runner positioned substantially normal to said first two runners, and each of said first two runners having a portion thereof abutting a side of said third runner.

3. The suspension system of claim 1 in which said two runners have portions thereof abutting each other.

4. The suspension system of claim 2 including a slot through said third runner, and the overlapping portions of said first two runners each passing through said third runner slot.

5. The suspension system of claim 1 in which the length of said slot is substantially normal to the longitudinal axes of said runners.

6. The suspension system of claim 1 in which said slot is curved along its length.

7. The suspension system of claim 5 in which said slot has two enlarged portions communicating with said restricted portion, and said restricted portion is located between said enlarged portions.

8. In a suspension system for ceiling panels in which at least two elongated runners are interconnected with their longitudinal axes substantially aligned, each of said runners having a vertical web and at least one horizontal panel supporting flange, the improvement comprising:
  (a) one end portion of the web of one of said runners overlapping one end portion of the web of the other of said runners,
  (b) one of said overlapping portions having an opening therethrough,
  (c) the other of overlapping portions having laterally projecting locking means,
  (d) said opening having a restricted portion of predetermined size,
  (e) said opening also having an enlarged portion of a size greater than the size of said restricted portion and communicating therewith,
  (f) said laterally projecting locking means having an outer portion of a size greater than the size of the restricted portion of said opening,
  (g) said laterally projecting locking means having an inner portion of a size to be received snugly within the restricted portion of said opening and being positioned within said restricted portion of said opening,
  (h) the outer portion of said laterally projecting locking means overlying the restricted portion of said opening,
  (i) said enlarged portion of said opening being of a size to pass said outer portion of said locking means therethrough during assembly and disassembly of said runners,
  (j) the restricted portion of said opening being vertically displaced with respect to the enlarged portion of said opening,
whereby the engagement of said laterally projecting locking means with the restricted portion of said opening interlocks said runners in substantially fixed relationship and prevents longitudinal movement of said ruunners relative to each other.

9. The suspension system of claim 8 including means for normally retaining said laterally projecting locking means in engagement with the restricted portion of said opening against accidental displacement therefrom.

10. The suspension system of claim 9 in which said restricted portion of said opening is substantially vertically aligned with the enlarged portion of said opening.

11. The suspension system of claim 9 in which said restricted portion of said opening is both vertically and longitudinally displaced in its web with respect to the enlarged portion of said opening.

12. The suspension system of claim 9 in which said opening is a curved slot.

13. The suspension system of claim 11 in which said opening is a curved slot.

14. The suspension system of claim 8 including a third runner positioned substantially normal to said first two runners, and each of said first wto runners having a portion thereof abutting a side of said third runner.

15. The suspension system of claim 8 in which said two runners have portions thereof abutting each other.

16. The suspension system of claim 8 in which at least part of one of said overlapping portions is offset in a plane parallel to but displaced from the major plane of its web.

17. The suspension system of claim 8 in which at least part of each of said overlapping portions is offset in a plane parallel to but displaced from the major plane of their respective webs.

18. In a suspension system for ceiling panels in which at least two elongated runners are interconnected with their longitudinal axes substantially aligned, each of said runners having a vertical web and at least one horizontal panel supporting flange, the improvement comprising:

(a) one end portion of the web of one of said runners overlapping one end portion of the web of the other of said runners, (b) each of said overlapping portions having an opening therethrough, (c) each of said overlapping portions also having laterally projecting locking means, (d) each of said openings having a restricted portion of predetermined size, (e) each of said openings also having an enlarged portion of a size greater than the size of said restricted portion and communicating therewith, (f) each of said laterally projecting locking means having an outer portion of a size greater than the size of the restricted portions of said openings, (g) each of said laterally projecting locking means having an inner portion of a size to be received snugly within the restricted portion of said openings and each of said inner portions being positioned within a restricted portion of one of said openings, (h) the outer portion of each of said laterally projecting locking means overlying the restricted portion of its cooperating opening, (i) said enlarged portions of said openings being of a size to pass the outer portion of a locking means therethrough during assembly and disassembly of said runners, (j) the restricted portions of each of said openings being vertically displaced with respect to the enlarged portion thereof, whereby the engagement of said laterally projecting locking means with the restricted portions of said openings interlocks said runners in substantially fixed relationship and prevents longitudinal movement of said runners relative to each other.

19. The suspension system of claim 18 including means for normally retaining each of said laterally projecting locking means in engagement with the restricted portions of the cooperating openings against accidental displacement therefrom.

20. The suspension system of claim 19 in which the restricted portion of each of said openings is substantially vertically aligned with the enlarged portion thereof.

21. The suspension system of claim 18 in which at least part of each of said overlapping portions is offset in a plane parallel to but spaced from the major plane of its respective web.

References Cited

UNITED STATES PATENTS

| | | | |
|---|---|---|---|
| 3,004,639 | 10/1961 | Choppa | 287—189.36A |
| 3,221,466 | 12/1965 | Downing et al. | 287—189.36AX |
| 3,221,846 | 12/1965 | Brown et al. | 287—189.36A |

DAVID J. WILLIAMOWSKY, Primary Examiner

W. L. SHEDD, Assistant Examiner

U.S. Cl. X.R.

52—667